March 6, 1956   B. H. HEFNER ET AL   2,737,157

AIR OPERATED PISTON AND CYLINDER ASSEMBLY

Filed June 21, 1952

Inventors
Bert H. Hefner &
Rudolph C. Weide

By Willits, Helmig & Baillio
Attorneys

United States Patent Office 2,737,157
Patented Mar. 6, 1956

2,737,157

AIR OPERATED PISTON AND CYLINDER ASSEMBLY

Bert H. Hefner and Rudolph C. Weide, La Grange, Ill., assignors to General Motors Corporation, Detroit Mich., a corporation of Delaware Application June 21, 1952, Serial No. 294,858

5 Claims. (Cl. 121—38)

This invention relates generally to pneumatic engines and more particularly to air engines used to throw heavy current electrical switches on diesel electric locomotives.

Most of the switches on locomotives of the type just mentioned are usually controlled by solenoid means. However, certain of the heavy switches on such locomotives require a great deal of driving effort and it is impractical to operate these switches by means of solenoids. The type of driving mechanism most commonly used for these switches is an air engine which includes a cylindrical housing and a pneumatically operated piston located within this cylindrical housing to actuate the switch throwing means. In order to prevent leakage in the air engine a flat type seal has been positioned adjacent a wall located well within the cylindrical housing. When the piston reaches the end of its travel because of air pressure on one side thereof, it strikes this flat seal and compresses it against the wall located within the cylinder. Due to such action this seal is subjected to a great deal of pounding by the piston and breaks down quite rapidly, making frequent replacement necessary.

This seal, however, is very inaccessible and in order to replace it the air engine must be completely disassembled. Disassembling, changing its seals, and reassembling the type of air engine presently used and doing it frequently takes a great deal of time, during which the locomotive must be idle, thereby causing an extensive loss of service. In other words, considerable saving in both time and money could be achieved if the life of this seal could be increased and, when necessary, the seal itself could be quickly and easily replaced.

It therefore becomes an object of this invention to provide an air engine having an improved circular air seal internally located which is of long life and simply and quickly replaced.

It is a further object of this invention to provide a unique seal within an air engine which is easily accessible and minimizes the time necessary to replace it.

It is another object of this invention to provide a symmetrical air engine whose oppositely disposed parts are interchangeable and which requires disassembly of only one side to replace an air seal within said engine.

It is a further object of this invention to provide an air engine which is of simple construction, inexpensive to manufacture, and uses a minimum of parts.

Figure 1:
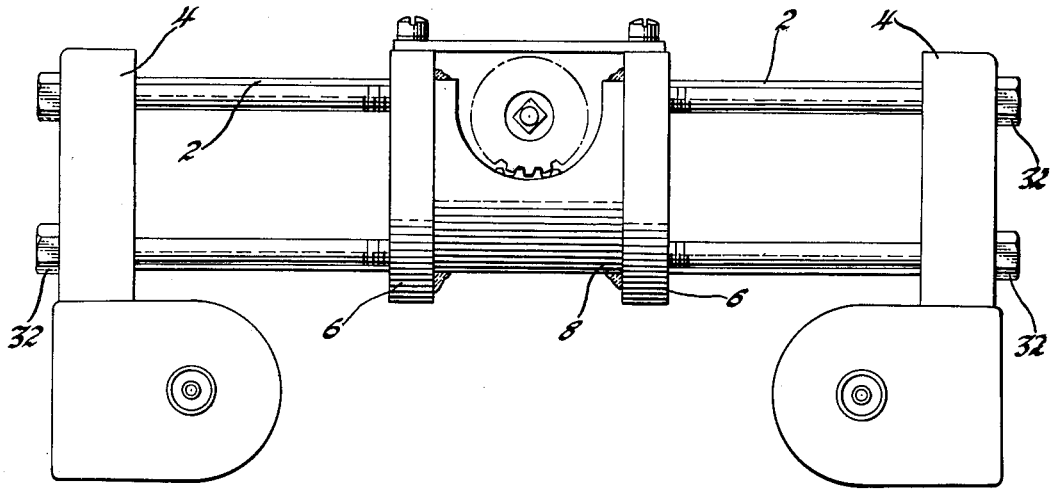
Figure 1 is an exterior view of the new air engine and shows a pair of cylindrical housings fastened between the two flanged plate magnetic valves and a pair of cylindrically connected inner flange blocks.
Figure 2:
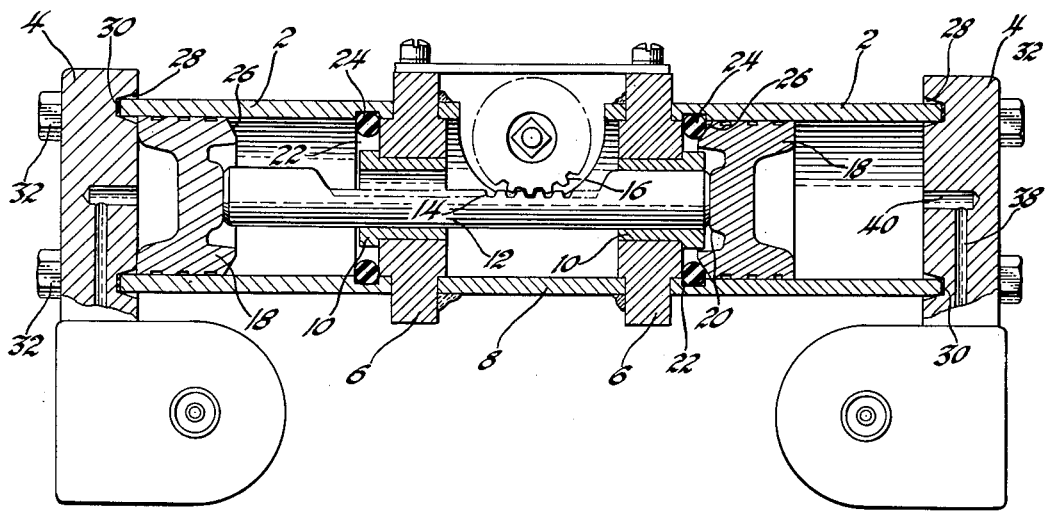
Figure 2 is a sectional view of the air engine showing the details of the new sealing structure and the quick means for assembling and disassembling the air engine to provide easy accessibility to the sealing means.

Referring now to the accompanying drawings it will be seen that the air engine is symmetrical in every respect and comprises a pair of cylindrical housings 2 fastened between a pair of flange plates 4 and a pair of inner flange blocks 6. Welded to the flange blocks 6 and located therebetween is a cylindrical member 8. A pair of bushings 10 are provided in each of the flange blocks 6 and slidingly contain a push rod 12. The push rod 12 is provided with a rack 14 to turn a pinion 16. The pinion 16 actuates the electrical switch.

Located within each of the cylindrical housings 2 is a piston 18 which has an abutting surface 20 for actuating the ends of the push rod 12. Each of the pistons 18 is provided with a bevelled end or surface 26. In the end of each of the cylindrical housings 2 located adjacent the inner flange blocks 6 is a groove 22 containing a seal ring 24 which has a circular cross section. One end of each of the cylindrical housings 2 is located in a recess 28 in its respective flange plate 4. In order to prevent air leakage a seal 30 is provided between the flange plate 4 and the end of the cylindrical housing 28. The oppositely disposed portions of the air engine are held together by means of the long shank bolts 32 fastened in the inner flange blocks 6.

In operation, air enters either one or the other of the ends of the air engine through passages 38 and 40 in the flange plates 4 and acts against one side of the piston 18. When the piston 18 has reached the end of its travel it engages the seal 24 with its bevelled surface 26 and compresses it against the closure member 6 to provide a tight seal. This structure prevents the escape of air between the inner surface of the seal 24 and the conical face 26 of the piston, and the outer surface of the seal 24 and the inner surface of cylindrical housing 2.

By using a seal of circular cross section any pounding on the seal tends to compress it into the groove 22 in the cylindrical housing 2 and the groove formed by the bevelled surface of the piston 18 and the flange block 6.

It may readily be seen that this type of seal will have a much greater life than the flat type of seal heretofore used which, when subjected to pounding, tends to shear and break down very rapidly.

The seal 24 may be quickly replaced by unscrewing the bolts 32 and separating the cylindrical housing from its location against the inner flange plate 6, removing the old seal and replacing it with a new seal, then repositioning the cylindrical housing 2 against the inner flange block 6 and tightening the bolts 32. It will thus be seen that an air engine has been described having a unique seal located to provide easy accessibility for replacement without having to disassemble the entire air engine. It should be appreciated that this type of air engine has many uses other than that for operating heavy current electrical switches and will provide great utility wherever high driving effort and excellent sealing means are necessary.

We claim:

1. An air engine comprising a cylindrical housing, a free piston operable within said housing, means to supply air pressure to one side of said piston, means acted upon by said piston and operable thereby, sealing means secured within said cylindrical housing adjacent one end thereof, supporting closure means for one end of said cylindrical housing and adjacent to said sealing means to provide accessibility to said sealing means, said sealing means being compressible between said piston and said supporting closure means when air pressure is supplied to the one side of said piston, and means to limit the compression of said sealing means between said piston and said closure means.

2. An air engine comprising a cylindrical housing having an internal groove adjacent one end thereof, O-ring sealing means positioned within said groove and protruding therefrom a free piston operable within said cylindrical housing, a bevelled end on said piston, said piston having a position adjacent to said sealing means in which position said bevelled portion of said piston abuts said sealing means, closure means for one end of said cylindrical housing and adjacent to said groove to provide accessibility to said sealing means, means to supply pressure to the interior of said housing and against a face of said piston whereby said seal is compressed in said groove and between said piston and closure means, means to limit the compression of said seal in said groove and between said piston and closure means, and means acted upon by said piston and operable thereby, said cylindrical housing with said piston and said sealing means being removable as a unit from said closure means and replaceable as a unit to expedite changing out of said sealing means.

3. An air engine comprising a pair of cylindrical housings, a pair of free pistons each operable back and forth within one of said housings, means to supply air pressure to one side of each of said pistons, operable means positioned between and extending into said cylindrical housings and acted upon by said pistons, closure means for the ends of said cylindrical housings and positioned between said cylindrical housings said closure means supporting said operable means for reciprocating movement relative thereto, O-ring sealing means located within a groove in each of said cylindrical housings adjacent said closure means to provide accessibility to said sealing means, said sealing means partially projecting out of said grooves to be compressed between said closure means and said pistons, means to limit the compression of said sealing means between said closure means and said pistons, and means to removably fasten said cylindrical housings to said closure means, each of said cylindrical housings with its associated free piston and sealing means forming an assembly removable as a unit from said closure means and replaceable as a unit to expedite changing out of said sealing means.

4. An air engine comprising a pair of cylindrical housings, a pair of free pistons each operable back and forth within one of said housings, means to supply air pressure to one side of each of said pistons, pinion and rack means positioned between said cylindrical housings the ends of said rack means extending into said cylindrical housings and being acted upon by said pistons, sealing means secured within each of said cylindrical housings and adjacent one end thereof, closure means for the ends of said cylindrical housings and adjacent said sealing means to provide accessibility to said sealing means, said sealing means being compressible between said closure means and said pistons, means to limit the compression of said sealing means between said closure means and said pistons, each of said cylindrical housings with its associated free piston and sealing means forming an assembly removable as a unit from said closure means and replaceable as a unit to expedite changing out of said sealing means.

5. Improvements in air engines for operating electrical switches and the like comprising a closure assembly at the center thereof, said closure assembly including a pinion and rack assembly for operating said switches and the like, said rack being supported by said closure member for reciprocating movement relative thereto, said rack having piston engaging ends extending out of said closure member on either side thereof, a pair of cylindrical housings on either side of said closure member into which said piston engaging ends extend, a pair of free pistons each operable back and forth within one of said housings and each engageable on one side thereof with an opposite piston engaging end of said rack, means to supply air pressure to one side of each of said pistons, an internal groove in an end of each of said cylindrical housings, said internal grooves being adjacent opposite sides of said closure means, O-ring sealing means secured in said grooves and partially projecting out of said grooves to be compressed between said closure means and said pistons, means to limit compression of said sealing means between said closure means and said pistons, and means to removably fasten said cylindrical housings to said closure means, each of said cylindrical housings with its associated free piston and O-ring sealing means forming an assembly removable as a unit from said closure means and replaceable as a unit to expedite changing out of said sealing means.

References Cited in the file of this patent

UNITED STATES PATENTS

| 820,701 | Coleman | May 15, 1906 |
| 1,277,000 | Turner | Aug. 27, 1918 |
| 1,945,680 | Fahrenkamp | Feb. 6, 1934 |
| 1,955,635 | Kelly | Apr. 17, 1934 |
| 2,192,175 | Ballard | Mar. 5, 1940 |
| 2,493,602 | Sterrett | Jan. 3, 1950 |
| 2,533,531 | Stephens | Dec. 12, 1950 |

FOREIGN PATENTS

| 531,883 | Great Britain | Jan. 13, 1941 |